US009690455B1

(12) United States Patent
Bilinski et al.

(10) Patent No.: US 9,690,455 B1
(45) Date of Patent: Jun. 27, 2017

(54) METHODS, SYSTEMS, AND MEDIA FOR PROVIDING MEDIA GUIDANCE BASED ON DETECTED USER EVENTS

(71) Applicant: Google Inc., Mountain View, CA (US)

(72) Inventors: Brandon Bilinski, San Francisco, CA (US); Alexander Collins, San Francisco, CA (US)

(73) Assignee: Google Inc., Mountain View, CA (US)

(*) Notice: Subject to any disclaimer, the term of this patent is extended or adjusted under 35 U.S.C. 154(b) by 554 days.

(21) Appl. No.: 14/255,288

(22) Filed: Apr. 17, 2014

(51) Int. Cl.
*G06F 3/048* (2013.01)
*G06F 3/0484* (2013.01)
*G06F 3/0487* (2013.01)

(52) U.S. Cl.
CPC .......... *G06F 3/0484* (2013.01); *G06F 3/0487* (2013.01)

(58) Field of Classification Search
CPC .................................................. G06F 3/0481
USPC ......................................................... 715/720
See application file for complete search history.

(56) References Cited

U.S. PATENT DOCUMENTS

2008/0022295 A1* 1/2008 Fukumiya ............ G11B 31/006
725/10
2010/0122277 A1 5/2010 Fonseca
2013/0217333 A1 8/2013 Sprigg et al.
2013/0326583 A1 12/2013 Freihold et al.
2014/0059576 A1 2/2014 Mule

FOREIGN PATENT DOCUMENTS

WO WO2007113580 * 10/2007 ............... H04N 7/24

OTHER PUBLICATIONS

"System and Method to Detect User Movement and Bookmark Video Playback Accordingly", last updated Jul. 18, 2013, pp. 1-4, available at: http://ip.com/IPCOM/000229287.

* cited by examiner

*Primary Examiner* — Matthew Ell
(74) *Attorney, Agent, or Firm* — Byrne Poh LLP

(57) ABSTRACT

Methods, systems, and media for providing media guidance are provided. In some implementations, a method for providing media guidance is provided, the method comprising: receiving device data from a mobile device associated with a display device; identifying a media content item being presented on the display device; determining a first indication that the mobile device has been interacted with during the presentation of the media content item; storing a first timestamp corresponding to the first indication; determining a second indication that the interaction with the mobile device has ceased; storing a second timestamp corresponding to the second indication; receiving an indication that the media content item is to be played back; determining, using a hardware processor, a first playback position in the media content item based on the first timestamp; and causing the media content item to be presented from the determined first playback position in response to receiving the indication.

18 Claims, 7 Drawing Sheets

METHODS, SYSTEMS, AND MEDIA FOR PROVIDING MEDIA GUIDANCE BASED ON DETECTED USER EVENTS

TECHNICAL FIELD

The disclosed subject matter relates to methods, systems, and media for providing media guidance based on detected user events. More particularly, the disclosed subject matter relates to detecting user events that may distract a user from consuming media content and playback the media content based on the detected user events.

BACKGROUND

When consuming media content, such as a television program, a user may be distracted when the user interacts with a mobile device (e.g., a mobile phone, tablet, etc.) by making a phone call, streaming media content, etc. To avoid missing a portion of the media content, the user may have to manually pause the playback of the media content immediately after being distracted by such an interruption. Alternatively, the user may have to manually rewind the media content to a playback position that precedes the occurrence of the interruption. This can, for example, create a disjoined experience for the user, where the user has to rewind the media content one or more times to locate a desired playback position to resume playback of the media content.

Accordingly, it is desirable to provide new mechanisms for providing media guidance.

SUMMARY

In accordance with some implementations of the disclosed subject matter, methods, systems, and media for providing media guidance based on detected user events are provided. In accordance with some implementations, a method for providing media guidance based on detected user events is provided, the method comprising: receiving device data from a mobile device associated with a display device; identifying, from the device data, a media content item being presented on the display device; determining, from the device data, a first indication that the mobile device has been interacted with during the presentation of the media content item; storing a first timestamp corresponding to the first indication; determining, from the device data, a second indication that the interaction with the mobile device has ceased; storing a second timestamp corresponding to the second indication; associating the first timestamp and the second timestamp with the identified media content item; receiving an indication that the media content item is to be played back; determining, using a hardware processor, a first playback position in the media content item based on the first timestamp; and causing the media content item to be presented from the determined first playback position in response to receiving the indication.

In accordance with some implementations of the disclosed subject matter, a system for providing media guidance based on detected user events is provided, the system comprising: at least one hardware processor that is configured to: receive device data from a mobile device associated with a display device; identify, from the device data, a media content item being presented on the display device; determine, from the device data, a first indication that the mobile device has been interacted with during the presentation of the media content item; store a first timestamp corresponding to the first indication; determine, from the device data, a second indication that the interaction with the mobile device has ceased; store a second timestamp corresponding to the second indication; associate the first timestamp and the second timestamp with the identified media content item; receive an indication that the media content item is to be played back; determine a first playback position in the media content item based on the first timestamp; and cause the media content item to be presented from the determined first playback position in response to receiving the indication.

In accordance with some implementations of the disclosed subject matter, a non-transitory computer-readable medium containing computer executable instructions that, when executed by a processor, cause the processor to perform a method for providing media guidance based on detected user events is provided. In some implementations, the method comprises: receiving device data from a mobile device associated with a display device; identifying, from the device data, a media content item being presented on the display device; determining, from the device data, a first indication that the mobile device has been interacted with during the presentation of the media content item; storing a first timestamp corresponding to the first indication; determining, from the device data, a second indication that the interaction with the mobile device has ceased; storing a second timestamp corresponding to the second indication; associating the first timestamp and the second timestamp with the identified media content item; receiving an indication that the media content item is to be played back; determining a first playback position in the media content item based on the first timestamp; and causing the media content item to be presented from the determined first playback position in response to receiving the indication.

In accordance with some implementations of the disclosed subject matter, a system for providing media guidance based on detected user events is provided, the system comprising: means for receiving device data from a mobile device associated with a display device; means for identifying, from the device data, a media content item being presented on the display device; means for determining, from the device data, a first indication that the mobile device has been interacted with during the presentation of the media content item; means for storing a first timestamp corresponding to the first indication; means for determining, from the device data, a second indication that the interaction with the mobile device has ceased; storing a second timestamp corresponding to the second indication; means for associating the first timestamp and the second timestamp with the identified media content item; means for receiving an indication that the media content item is to be played back; means for determining a first playback position in the media content item based on the first timestamp; and means for causing the media content item to be presented from the determined first playback position in response to receiving the indication.

In some implementations, the system further comprises means for determining a second playback position in the media content item based on the second timestamp; and means for causing the media content item to be presented based on the first playback position and the second playback position.

In some implementations, the system further comprises means for generating a first snippet of the media content item based on the first timestamp and the second timestamp.

In some implementations, the system further comprises means for storing a plurality of first timestamps corresponding to a plurality of indications that the mobile device has been interacted with during the presentation of the media content item; means for storing a plurality of second timestamps corresponding to a plurality of indications that the interaction with the mobile device has ceased; and means for generating a plurality of snippets of the media content item based on the plurality of first timestamps and the plurality of second timestamps.

In some implementations, the system further comprises means for generating a composite video by combining the plurality of snippets of the media content item; and means for transmitting the composite video to the mobile device.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify the like elements.

DETAILED DESCRIPTION

Figure 1:
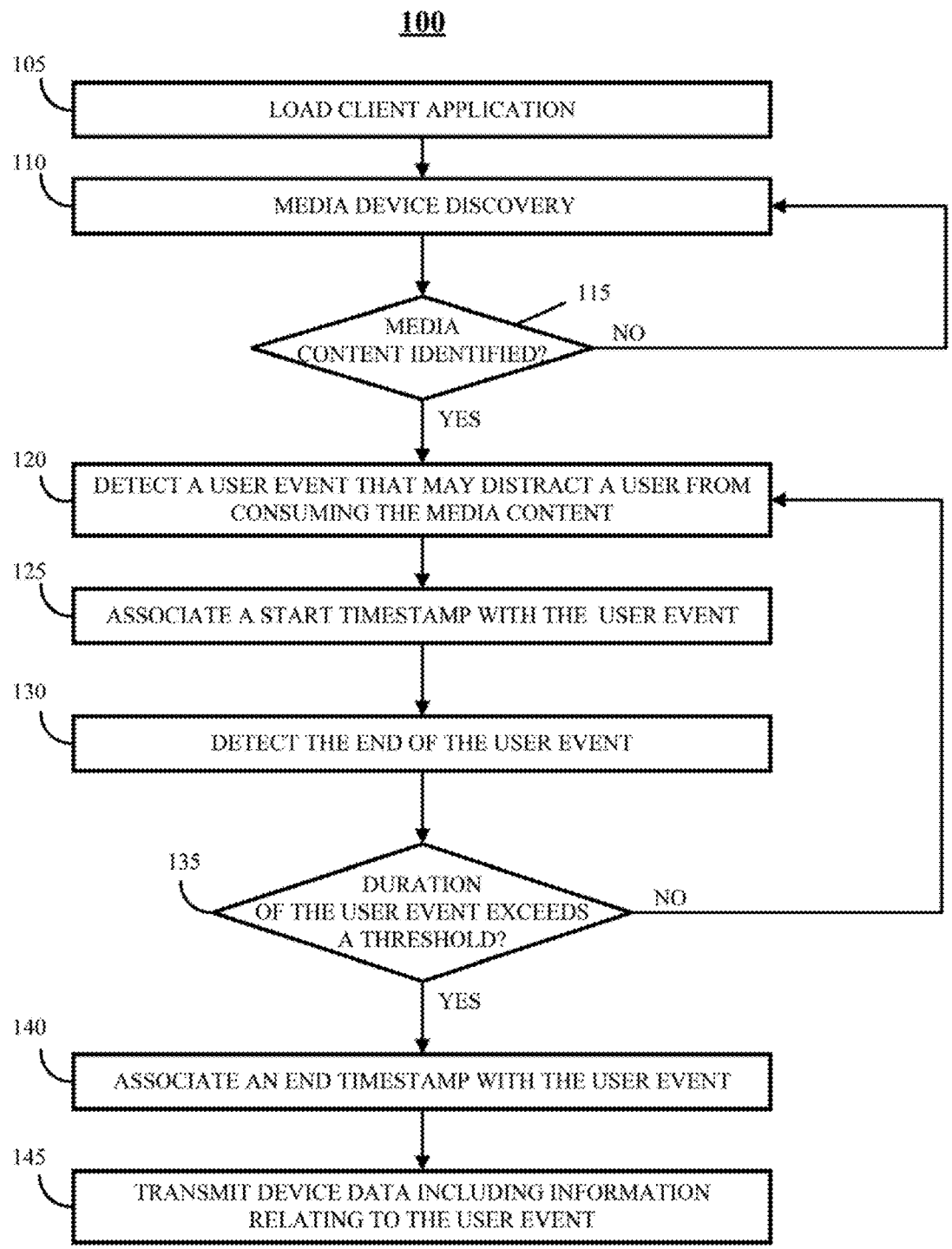
FIG. 1 shows an illustrative example of a process for detecting user events that occur during presentation of media content in accordance with some implementations of the disclosed subject matter.

In accordance with some implementations, as described in more detail below, mechanisms, which can include methods, systems, and/or computer readable media, for providing media guidance based on detected user events are provided.

These mechanisms can be used in a variety of applications. For example, these mechanisms can be used to detect user events that are deemed to distract a user from consuming media content (e.g., a broadcast television program, a streaming media program, a recorded program stored in a recording device, etc.) and present portions of the media content that the user has missed due to the user events. In a more particular example, upon detecting the start of such a user event during the presentation of a media content (e.g., a user interacting with a video streaming application running on the mobile phone, a user leaving a room in which the media content is presented, etc.), the mechanisms can store a start timestamp corresponding to the start of the detected user event. The mechanisms can then playback the media content based on the start timestamp. In another more particular example, upon detecting multiple user events during presentation of the media content, the mechanisms can present to a user multiple portions of the media content corresponding to the detected events (e.g., on a display associated with a media device, a mobile device, etc.).

In another example, these mechanisms can be used to provide multiple users with personalized media guidance. In a more particular example, while media content is being presented to multiple users (e.g., on a television in a living room), the mechanisms can detect user events and store timestamps and any other suitable information relating to the user events for each of the users. In such an example, in response to receiving a rewind request from a particular user, the mechanisms can present the media content based on the detected events associated with that user (e.g., on a second screen device associated with the user, such as a mobile device). That is, the mechanisms can present the portions of the media content that the particular user has missed due to interacting with the user's mobile device and/or any other user event that distracted the user from consuming the media content. In some implementations, the mechanisms can determine what particular users each having a user device has missed in the media content due to a user event and providing playback options based on the other users associated with the media device. For example, in response to determining that a first user having a first user device has missed media content due to a user event while a second user having a second user device consumed the media content missed by the first user, the mechanisms can provide the first user device and/or the media device with playback options upon determining that the second user having the second user device has left the room in which the media content is being presented.

In some implementations, the mechanisms described herein can be implemented using a media device (e.g., a digital video recorder, a digital media player, a television device, etc.), a mobile device (e.g., a mobile phone, a tablet computer, a wearable computer, etc.), and a server.

In some implementations, while media content (e.g., a television program, a streaming media program, etc.) is being presented by a media device, the mechanisms can detect user events that can distract a user from consuming the media content. For example, the mechanisms can detect the occurrence of such a user event upon receiving an indication that a user has interacted with a mobile device (e.g., the user unlocking the mobile device, the user interacting with an application running on the mobile device, etc.). As another example, the mechanisms can detect the occurrence of such a user event upon determining that the mobile device is not within a predetermined proximity of the media device (e.g. by determining that the strength of a wireless signal transmitted from the media device is not greater than a threshold value).

It should be noted that, prior to detecting user events or collecting any data relating to a user, these mechanisms can provide the user with an opportunity to provide a consent or authorization to perform actions, such as detecting user interactions with a mobile device. For example, upon loading an application on a mobile device, the application can prompt the user to provide authorization for detecting user events and/or rewinding media content based on the detected user events.

In some implementations, upon detecting a user event during the presentation of the media content, the mechanisms can associate a start timestamp (e.g., a timestamp corresponding to the start of the detected user event) with the detected user event. In some implementations, the mechanisms can store the start timestamp in association with information about the detected user event (e.g., an event identifier that can identify the user event, a description of the user event, etc.), program information relating to the media content (e.g., a program title, a channel number, etc.), and/or any other suitable information in a suitable storage device (e.g., a server).

In some implementations, the mechanisms can associate an end timestamp with the detected user event upon determining that the detected user event has ended. Additionally, the mechanisms can store the end timestamp with information about the detected user event (e.g., the start timestamp, the user event identifier, the description of the user event, etc.). In some implementations, the mechanisms can determine that the user event has ended in response to determining that the user has ceased interacting with a particular application running on the mobile device, that the user has re-entered a predetermined proximity of the media device, etc.

In some implementations, the mechanisms can rewind and/or present the media content based on one or more user events detected during the presentation of the media content. For example, in response to receiving a request to rewind the media content from a user, the mechanisms can automatically playback the media content from a position corresponding to the start of a detected event associated with the user (e.g., the most recent user event that occurred during the presentation of the media content, a user event having a particular duration, etc.).

As another example, upon detecting one or more user events associated with a user during the presentation of the media content, the mechanisms can cause information about the detected user events to be presented to the user (e.g., using the media device, the mobile device, and/or any other suitable device) and can prompt the user to identify one or more of the detected user events. In some implementations, the mechanisms can playback the media content from a playback position corresponding to one or more user events identified by the user.

As yet another example, upon detecting multiple user events associated with a user during the presentation of media content, the mechanisms can identify multiple portions of the media content corresponding to the user events (e.g., based on a set of start timestamps and a set of end timestamps associated with the detected user events). The mechanisms can then present the identified portions of the media content to the user (e.g., in the form of multiple snippets of media content, a video clip generated by stitching the portions of the media content together, etc.).

Turning to FIG. 1, a flow chart of an example 100 of a process for detecting user events during presentation of media content is shown in accordance with some implementations of the disclosed subject matter.

As illustrated, process 100 can begin by loading a client application at 105. In some implementations, the client application can be loaded on a suitable mobile device comprising one or more hardware processors, such as a mobile phone, tablet computer, wearable computer, etc. In a more particular example, the client application can be uploaded on a mobile device 630 as described hereinbelow in connection with FIGS. 6 and 7.

At 110, once the client application is loaded, the client application can initiate media device discovery in some implementations. For example, media device discovery can be initiated on a network to which the mobile device is connected. In a more particular example, the client device can search for media devices on a network (e.g., a WiFi network) utilizing the Discovery And Launch (DIAL) protocol. In another more particular example, a full discovery protocol can be executed that causes the computing device to send a User Datagram Protocol (UDP) multicast message on a network to which the mobile device is connected. In some implementations, the UDP can include an M-Search message directed to media devices, such as digital media renderers and/or digital media servers, digital media players, or any other suitable media device that outputs, processes, and/or presents media content. In some implementations, the UDP multicast message can include an address of the device sending the message (e.g., the network address of the mobile device), and can include a time period during which replies are to be sent. Such a time period can be any suitable time period, such as one second, two seconds, etc., and can be set based on any suitable factors.

As another example, media device discovery can be initiated to determine whether media devices are in the proximity of the mobile device. In another more particular example, the client application can execute a BLUETOOTH Service Discovery Protocol (SDP) and/or any other suitable SDP that allows a device to discover other devices through a short-range connection.

It should be noted that, prior to initiating media device discovery or performing any action on the mobile device, the client application can provide a user of the mobile device with an opportunity to provide a consent or authorization to perform actions on the mobile device, such as detecting media devices connected to the mobile device, detecting user interactions with the mobile device, recording and/or transmitting device data, etc. For example, upon loading the client application on the mobile device, the client application can prompt the user to provide authorization for detecting user interactions with the mobile device and/or rewinding media content based on the detected user interactions. In a more particular example, in response to downloading the client application and loading the client application on the mobile device, the user can be prompted with a message that requests (or requires) that the user provide consent prior to performing these actions. Additionally or alternatively, in response to installing the client application, the user can be prompted with a permission message that requests (or requires) that the user provide consent prior to performing these detections and/or transmitting information relating to these detections.

In some implementations, upon detecting the presence of a media device, the client application can enter a media content detection mode and can determine whether media content (e.g., a television program, a streaming media program, etc.) is being presented by the media device at 115. For example, the client application can cause the mobile device to query the media device to identify media content that is currently being presented by the media device. As another example, the client application can determine that media content is being presented by the media device upon detecting that the mobile device is streaming the media content via the media device (e.g., using the client application, a second screen application, and/or any other suitable application).

In some implementations, in response to determining that the detected media device is not currently playing back media content ("NO" at 115), process 100 can return to 105 and initiate an updated media device discovery process. For example, process 100 can initiate a new device discovery process and can search for media devices connected to a different network and/or using a different device discovery protocol. As another example, process 100 can refresh the previously initiated media device discovery and determine whether any media device has been connected to the previously identified network. As yet another example, the user of the mobile device can be prompted to provide and/or verify information relating to a media device that is presenting media content.

Alternatively, in response to identifying the media content being presented by the media device ("YES" at 115), the client application can enter a user event detection mode at 120 to detect user events that may distract a user from consuming the media content. In some implementations, such a user event can correspond to any suitable user interaction or interactions with a mobile device, such as a user selection of a button on the mobile device, a user interacting with the screen of the mobile device, a user unlocking the mobile device, etc.

For example, the client application can detect the occurrence of such a user event in response to receiving an indication that a user has interacted with a particular application running on the mobile device, such as a video streaming application, a media player application, a video conferencing application, an application providing telephone services (e.g., a voice over Internet Protocol (VOIP) application), etc. In some implementations, the particular application can be designed by a user.

As another example, the client application can detect the occurrence of such a user event in response to receiving an indication that a user has interacted with an application that is associated with a particular category. In some implementations, a category of applications may include applications that can provide any suitable functionality, such as applications that can provide audio and/or video output (a video streaming application, a video conferencing application, a VOIP application, etc.), applications that can provide messaging service (e.g., a messaging application), applications that can provide telephone service (e.g., a VOIP application), etc. In some implementations, the client application can prompt a user to designate user interactions with one or more particular categories of applications as distractions.

As yet another example, the client application can detect the occurrence of such a user event in response to detecting a particular user interaction with the mobile device, such as consuming video content and/or audio content, making a phone call, leaving a predetermined proximity of the media device, etc. In some implementations, the client application can determine that the user has left a predetermined proximity of the media device in response to determining that the strength of a signal transmitted from the media device (e.g., a BLUETOOTH signal and/or any other suitable short-range signal) is not greater than a threshold. In some implementations, the client application can receive audio data from an audio input device (e.g., a microphone) coupled to the mobile device and can determine whether the audio data contains a portion corresponding to the playback of the media content. Additionally or alternatively, the client application can determine that the user has left a predetermined proximity of the media content in response to determining that a volume of the portion corresponding to the playback of the media content is not greater than a threshold.

As still another example, the client application can detect such a user event in response to detecting that the duration of the user event (e.g., a user interacting with any suitable application running on the mobile device, etc.) has exceeded a predetermined time period. In some implementations, the time period can be provided by a user. In some implementations, the client application can prompt a user to set a threshold time period for a particular type of event, such as user interactions with a particular application (e.g., one minute for user interactions with a VOIP application, ten minutes for user interactions with a messaging application, etc.), user interactions with a particular application with a particular category of application, a particular user interaction with the mobile device, etc.

As a further example, the client application can detect the occurrence of such a user event in response to detecting a threshold number of applications that a user has interacted with. Alternatively or additionally, the client application can detect the occurrence of the user event in response to detecting a threshold number of user interactions with the mobile device.

In some implementations, in response to detecting a user event during the presentation of the media content, the client application can associate a start timestamp with the detected user event at 125. For example, the client application can associate a timestamp corresponding to the start of the detected user event with an event identifier that can identify the detected user event (e.g., an index number), a description of the detected user event (e.g., an application that the user has interacted with), and/or any other suitable information relating to the detected user event. In some implementations, the start timestamp can correspond to a time position in the media content corresponding to the start of the detected user event. In some implementations, the client application can associate the detected user event with program information relating to the media content (e.g., a program title, a channel number, etc.).

In some implementations, the client application can cause the associated information to be stored in a storage device coupled to the mobile device (e.g., memory of the mobile device). In some implementations, the client application can transmit device data including the associated information for storage. For example, the device data can include the start timestamp, the user event identifier, the description of the detected user event, the program information, and/or any other suitable information associated with the detected user event.

In some implementations, the client application can determine that the detected user event has ended at 130. For example, the client application can detect the end of the user event in response to detecting an indication that a user has ceased interacting with the mobile device. In a more particular example, the end of the user event can be detected in response to determining that the mobile device has entered a low power state, a sleep state, or a power conservation state after a certain period of inactivity. In another more particular example, the end of the user event can be detected in response to detecting that the mobile device has exited the application that the user has been interacting with (e.g., a video streaming application, an email application, etc.). In yet another more particular example, the end of the user event can be detected in response to detecting that the mobile device entered a predetermined proximity of the media device (e.g., by determining that the strength of a wireless signal transmitted from the media device is greater than a threshold, by detecting that a volume of an audio sample representative of the presentation of the media content is greater than a threshold, etc.).

In some implementations, in response to detecting the end of the user event, the client application can determine whether the duration of the detected user event exceeds a predetermined time period at 135. In some implementations, a detected event can be ignored when the duration of the detected user event does not exceed the predetermined time period. In some implementations, the predetermined time period can be a default time period for a particular type of event (e.g., one minute for user interactions with an application providing audio and/or video output, two minutes for a user leaving the room in which the media content is presented, etc.). Alternatively or additionally, the predetermined time period can be set by a user of the client application.

In some implementations, in response to determining that the duration of the detected user event does not exceed a predetermined time period, process 100 can return to 120 and can detect a next user event that may distract the user from consuming the media content item.

Alternatively, in response to determining that the duration of the detected user event exceeds a predetermined time period, the application can associate an end timestamp with the detected user event at 140. In some implementations, the end timestamp can indicate a time position in the media content corresponding to the end of the detected user event. Alternatively, the end timestamp can correspond to the end of the media content, in some implementations in which the media content has ended prior to the end of the detected user event.

In some implementations, the client application can associate the end timestamp with the user event identifier of the detected user event, the description of the detected user event, program information relating to the media content, and/or any other suitable information that can be used to index and/or store information relating to events that occurred during presentation of the media content.

In some implementations, at 145, the client application can transmit device data including information associated with the detected user event. In some implementations, the device data can include any suitable information associated with the detected user event, such as the start timestamp associated with the detected user event, the end timestamp associated with the detected user event, the duration of the detected user event, the user event identifier associated with the detected user event, a description of the detected user event, and/or any other suitable information that can be used to identify the detected user event.

In some implementations, the device data can include any suitable program information relating to the media content identified at 120. For example, the device data can include a program title, a channel number, a start time, an end time, an episode number, a series number, etc. Additionally, the device data can include any suitable identifying information relating to the mobile device, such as a MAC address, serial number, product identifier, and/or any other suitable information that can be used to identify the mobile device.

In some implementations, device data relating to one or more detected user events can be transmitted periodically to a server that performs event detection. For example, the client application can transmit timing information (e.g., start timestamps, end timestamps, etc.) associated with one or more detected user events to a server for storage and/or analysis. In some implementations, as described below in connection with FIG. 3, the server can calculate a duration of a particular user event based on a start timestamp and an end timestamp associated with the user event and then determine whether the user event is deemed to distract the user from consuming the media content (e.g., by comparing the duration of the user event with a threshold). In some implementations, the server can rank multiple user events by duration and/or any other suitable criterion or criteria and can then identify one or more of the user events as distractions based on the ranking.

In some implementations, the client application can associate a distraction indicator with each detected user event and transmit the distraction indicator along with the device data. In some implementations, the distraction indicator can indicate how distracted a user is deemed to be due to a given user event. For example, distraction indicator "5" can be associated with a user event that is deemed to be a high level of distraction, while distraction indicator "1" can be associated with a user event that is deemed to be a low level of distraction. In some implementations, the level of distraction of a given user event can be determined and/or a distraction indicator can be associated with the user event based on any suitable information relating to the user event, such as the duration of the user event, the category of applications that has been interacted with during the user event, the number of applications that have been interacted with during the user event, etc. For example, distraction indicator "1" can be assigned to a user event corresponding to a user unlocking a mobile device and interacting with the screen of the mobile device for five seconds. As another example, distraction indicator "5" can be assigned to a user event corresponding to running a video streaming application for ten minutes. In some implementations, the client application can prompt a user to associate a particular distraction indicator with one or more types of user events, such as a user event having a particular duration, a user event involving user interactions with a particular category of applications, a user event involving user interactions with a particular application, a user event involving user interactions with a particular number of application, a user event involving a particular number of user interactions with a mobile device, etc. For example, a user can designate a user event involving user interactions with an email application for a particular time period (e.g., ten minutes) as a level "3" distraction. As another example, a user may designate a user event involving user interactions with a video streaming for a particular time period (e.g., one minute) as a level "5" distraction.

In some implementations, the client application can rank multiple detected user events based on the distraction indicators associated with the user events and can select a predetermined number of user events based on the ranking (e.g., the top 3 user events). The client application can then send device data (e.g., timing information, distraction indicators, etc.) relating to the selected user events to a server for storage and/or analysis (e.g., creating playback options, generating an aggregated snippet of media content, etc.).

It should be noted that in implementations described herein in which the client application (or other mechanisms described herein) collects information about a particular user, the user can be provided with an opportunity to control whether the client application collects information about particular users and/or how collected user information is used by the client application. Examples of information about a user can include the user's interests and identifying information of the user (e.g., a user profile, user credentials, device identification, etc.). Additionally, certain information about the user can be stored locally (e.g., not shared), encrypted, and/or treated in one or more ways before it is stored to remove personally identifiable information. For example, the client application can store user preferences and/or user interests for a particular user with an anonymous user identifier (e.g., a user identifier that is not associated with the user's name, the user's username and/or password, the user's email address, etc.). Using these techniques, the user can have control over what information is collected about the user and/or how that information is used by the client application.

Figure 2:
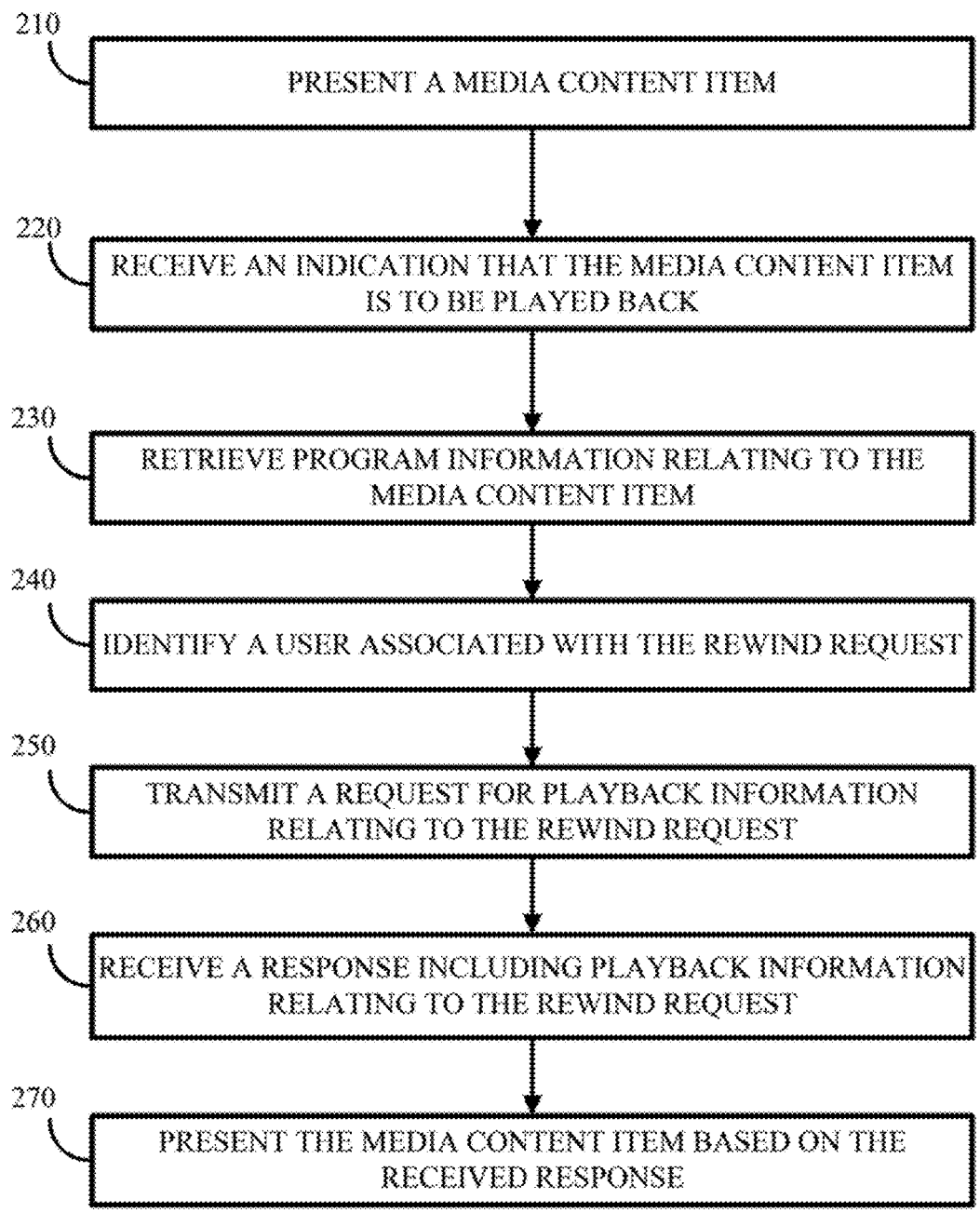
FIG. 2 shows an illustrative example of a process for presenting media content based on detected user events in accordance with some implementations of the disclosed subject matter.

Turning to FIG. 2, an illustrative example 200 of a process for presenting media content based on interruptions detected during presentation of the media content is shown in accordance with some implementations of the disclosed subject matter. In some implementations, process 200 can be implemented by one or more hardware processors of any suitable device, such as a hardware processor 712, 722, and/or 732 as described hereinbelow in connection with FIG. 7.

As illustrated, process 200 can begin by presenting a media content item at 210. In some implementations, the media content can include one or more programs from various sources, such as programs broadcast over-the-air, programs broadcast by a cable television provider, programs broadcast by a telephone television provider, programs broadcast by a satellite television provider, on-demand programs, over-the-top programs, Internet content, streaming media programs, recorded programs, etc.

At 220, process 200 can receive an indication that the media content item is to be played back. In some implementations, the indication can correspond to a user input indicative of a user's desire to rewind the presentation of the media content item. For example, the user input can correspond to a user selection of a rewind button using a suitable input device, such as a user input device 716 or a user input device 726 as described below in connection with FIG. 7. As another example, the user input can correspond to a voice command indicative of a user's desire to rewind the presentation of the media content. In a more particular example, a voice command of "rewind" can be provided by a user consuming the media content and can be detected by a suitable audio input device (e.g., a microphone coupled to a media device, mobile device, etc.). In another more particular example, a voice command of "show me all the things I missed" can be provided by a user to indicate a desire to watch portions of the media content corresponding to multiple user events that occurred during the presentation of the media content.

In some implementations, the indication can correspond to detection of one or more user events that are deemed to distract a user from consuming the media content item. In some implementations, upon detecting one or more user events during the presentation of the media content (e.g., using process 100 of FIG. 1), the mechanisms described herein can inform the user about the detected user events by presenting a suitable interface and/or using any other suitable mechanism. For example, a hardware processor can provide an indication on a display (e.g., a display 714 and/or a display 724 of FIG. 7) that indicates to the user "An interruption has been detected. Do you want to rewind the video before this interruption occurred? Say 'rewind' now." In another example, a hardware processor can provide an icon or indicator on the display that indicates to the user that a rewind option to automatically rewind prior to the occurrence of the detected user event is available. Additionally or alternatively, the user may be prompted to select a detected event corresponding to a desired rewinding point (e.g., by issuing a voice command corresponding to the detected user event).

As another example, upon detecting the user events associated with the user, the mechanisms described herein can generate an indication that the media content item is to be played back for the user in response to detecting that other users (e.g., users that were consuming the media content item with the user associated with the detected user events) are not present within a predetermined proximity of a media device on which the media content item is being presented.

In some implementations, at 230, process 200 can retrieve program information relating to the media content item. In some implementations, the program information can include a program title, a start time, an end time, an episode number, a series number, an identifier (e.g., a uniform resource identifier (URI)) associated with the media content item, and/or any other suitable information relating to the media content item. In some implementations, the program information can include any suitable information relating to a source that provides the media content item, such as a channel number of a channel that broadcasts the media content item, a description of a content provider that provides the media content item, a link (e.g., a uniform resource locator (URL)) to the media content item, etc.

At 240, process 200 can identify a user associated with the rewind request. In some implementations, the user can be identified using any suitable identifying information. For example, the identifying information can include any suitable information that can be used to uniquely identify a mobile device associated with the user, such as a device identifier, a media address control (MAC) address, a serial number, a product identifier, and/or any other suitable information that can be used to identify the mobile device. As another example, the identifying information can include any suitable information that can be used to identify the user, such as a user identifier, an email address, a username, a pass code, an image, a fingerprint, and/or any other suitable information that can be used to identify the user.

In some implementations, process 200 can receive such identifying information using any suitable technique or combination of techniques. For example, process 200 can prompt the user to provide such identifying information by presenting a suitable user interface and/or using any other suitable mechanism. As another example, process 200 can receive the identifying information from a mobile device associated with the user. In a more particular example, the identifying information can be extracted from the rewind request in some implementations in which the rewind request is transmitted from the mobile device. In another more particular example, process 200 can receive the identifying information from the mobile device as a response to a request submitted to the mobile device for such identifying information. In some implementations, the receipt of such a request can initiate a process on the mobile device to supply such information to process 200 as a response to the request. Additionally, the mobile device can query a user prior to sending such a response to request permission from the user to send the response. In yet another more particular example, process 200 can receive the identifying information using a suitable device discovery protocol, such as Simple Service Discovery Protocol (SSDP), discovery protocols associated with the BLUETOOTH wireless protocol, etc.

It should be noted that in some implementations described herein in which the mechanisms described herein collect information about a particular user, the user can be provided with an opportunity to control whether the mechanisms collect information about particular users and/or how collected user information is used by the mechanisms. Examples of information about a user can include the user's interests and identifying information of the user (e.g., a user profile, user credentials, device identification, etc.). Additionally, certain information about the user can be stored locally (e.g., not shared), encrypted, and/or treated in one or more ways before it is stored to remove personally identifiable information. For example, the mechanisms can store user preferences and/or user interests for a particular user with an anonymous user identifier (e.g., a user identifier that is not associated with the user's name, the user's username and/or password, the user's email address, etc.). Using these techniques, the user can have control over what information is collected about the user and/or how that information is used by the mechanisms described herein.

At 250, process 200 can transmit a request for playback information relating to the rewind request. In some implementations, the request for playback information can include any suitable information relating to the rewind request. For example, the request can include any suitable information that can be used to locate playback information relating to the media content and the identified user, such as program information relating to the media content (e.g., a program title, a channel number, a URL, etc.), identifying information relating to the user (e.g., identifying information of a mobile device associated with the user, identifying information associated with the user, etc.), etc. As another example, the request can include an indication that indicates whether the user intends to watch multiple portions of the media content item corresponding multiple user events (e.g., an indication corresponding to a voice command of "Show me all the things that I missed").

At 260, process 200 can receive a response corresponding to the request transmitted at 250. The response can include any suitable playback information responsive to the rewind request. For example, the response can include one or more timestamps associated with user events that occurred during the presentation of the media content item, such as a user interacting with a mobile device, a user leaving a predetermined proximity of a media device that played back the media content item, etc. In a more particular example, the response can include a start timestamp corresponding to the start of a detected event and/or an end timestamp corresponding to the end of the detected user event. In another more particular example, the response can include multiple timestamps corresponding to multiple user events along with event identifiers, descriptions, and/or any other suitable information relating to the user events.

As another example, the response can include any suitable information that can be used to present one or more portions of the media content corresponding to one or more user events. In a more particular example, the response can include one or more uniform resource locators (URLs) associated with the portion(s) of the media content, Hyper-Text Markup Language (HTML) files, snippets of the media content, images, scripts, style sheets, audio files, and/or any other suitable data that can be used to present the media content responsive to the rewind request.

At 270, process 200 can present the media content item based on the received response. In some implementations, the media content item can be presented using any suitable device, such as the media device, a mobile device, etc. In some implementations, process 200 can determine a playback position in the media content based on the response. Process 200 can then rewind the media content to the playback position and cause the media content to be presented from the playback position. For example, a playback position can correspond to a start timestamp associated with a user event, such as the most recent user event, the second most recent user event, a user event with a duration greater than a predetermined threshold, a user event of a particular type (e.g., a user interaction with a particular application), and/or any other suitable user event that occurred during the presentation of the media content item.

As another example, process 200 can designate a time position in the media content prior to the occurrence of a detected user event as a playback position. In a more particular example, process 200 can automatically designate a playback position that is a particular period of time prior to a detected event (e.g., five seconds prior to the detected user event). In another more particular example, process 200 can determine a user-designated preference for assigning a playback position. More particularly, for example, the user when setting up the client application can be requested to input a time interval for assigning playback positions in response to a detected user event (e.g., always thirty seconds prior to the detected user event). In yet another more particular example, process 200 can detect a scene change in the media content that precedes the time instant corresponding to the occurrence of the detected audio event. Process 100 can then cause the media content to be presented from the detected scene change.

Figure 5:
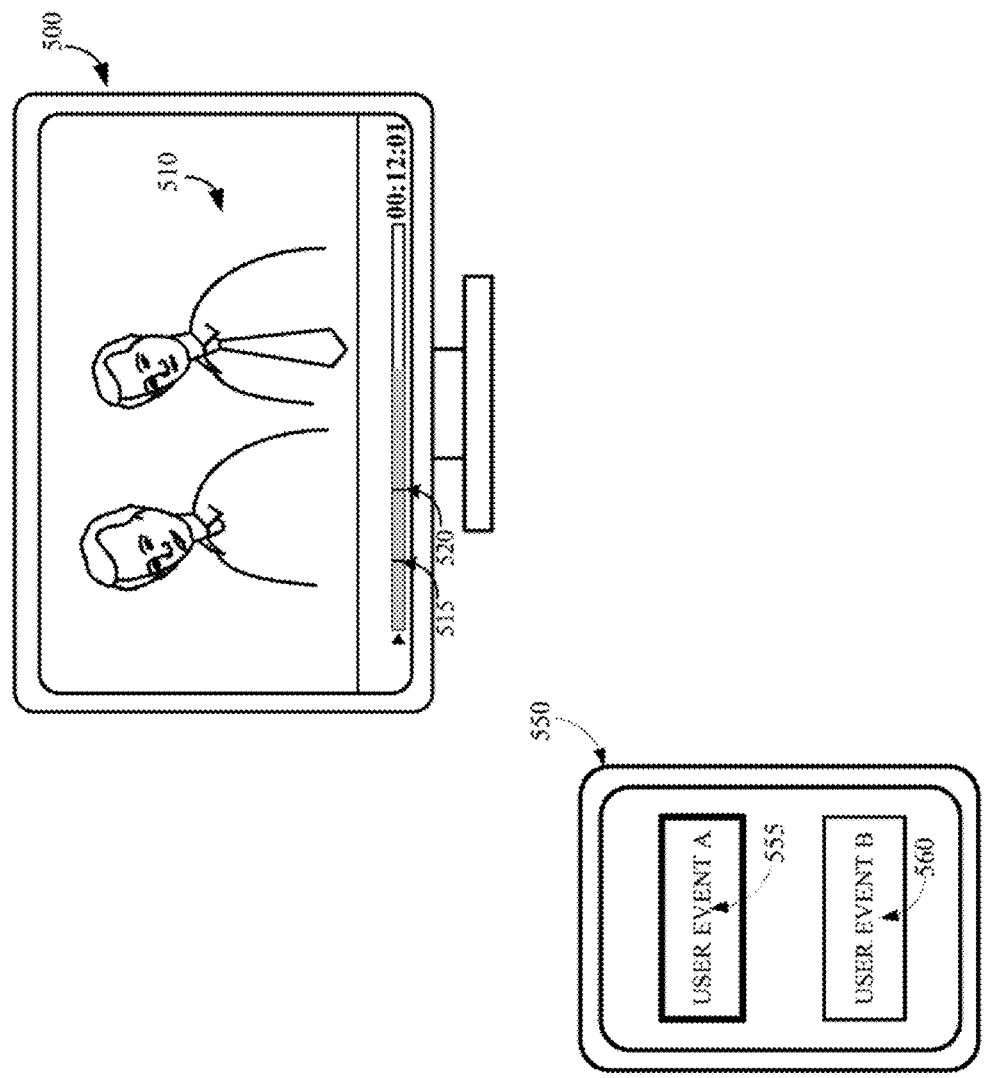
FIG. 5 shows an illustrative example of a display screen for presenting media content and rewinding the media content based on detected user events in accordance with some implementations of the disclosed subject matter.

In some implementations, as shown in FIG. 5, when media content is being presented by a media device 500, one or more user events can be detected during the presentation of the media content as described above in connection with FIG. 1. In some implementations, the detected user events can include a first event (e.g., a user interacting with an application running on a mobile device) occurring at a time 515 during the presentation of the media content and a second event (e.g., a user leaving the proximity of the media device) occurring at a time 520 during the presentation of the media content. The first event and the second event can be associated with time 515 and 520, respectively. Additionally or alternatively, a description can be associated with each of the first event and the second event and can be presented on display 510. In some implementations, information relating to the detected user event can be presented on a mobile device 550. For example, information relating to the first event and the second event can be presented using a user interface element 555 and a user interface element 560, respectively.

In some implementations, in response to receiving a user selection of a particular user event (e.g., by selecting an interface element corresponding to the user event using mobile phone 550 element, by selecting a time and/or any other suitable information relating to the user event on display 510, etc.), process 200 can rewind the media content item to a position in the media content item corresponding to the selected user event.

In some implementations, process 200 can identify one or more portions of the media content item based on the response received at 260. For example, process 200 can extract multiple timestamps from the received response and identify one or more portions of the media content based on the timestamps. In a more particular example, the boundaries of a given portion of the media content can be defined by a start timestamp and an end timestamp associated with a detected user event. In some implementations, upon identifying one or more portions of the media content item, process 200 can present the identified portions of the media content item. For example, process 200 can generate a snippet for each of the identified portions of the media content item and cause the snippet to be presented to a user. As another example, process 200 can generate a composite video by combining the identified portions of the media content item and cause the composite video to be presented to the user. In a more particular example, a first portion of the media content item can be combined with a second portion of the media content by concatenating the last frame of the first portion and the first frame of the second portion, by inserting a blank frame between the first frame and the second frame, and/or in any other suitable manner.

In some implementations, the composite video and or one or more snippets of the media content item can be generated by a server and can then be streamed to a media device, a mobile device, and/or any other suitable device. In a more particular implementation, the server can transmit information that can be used to present the composite video and/or the snippets via one or more response messages. In some implementations, the response messages can be transmitted using a suitable communication protocol, such as the Hypertext Transfer Protocol (HTTP), the File Transfer Protocol (FTP), and/or any other communication protocol. In some implementations, the response messages can include the composite video and/or snippets of media content, data that can be used to present the composite video and/or snippets (e.g., one or more uniform resource locators (URLs) associated with the composite video, a set of URLs associated with the a set of segments of the composite video, presentation time stamps associated with the set of segments, HyperText Markup Language (HTML) files, images, scripts, style sheets, audio files, and/or any other suitable data that can be used to present the composite video), and/or any other suitable data.

Figure 3:
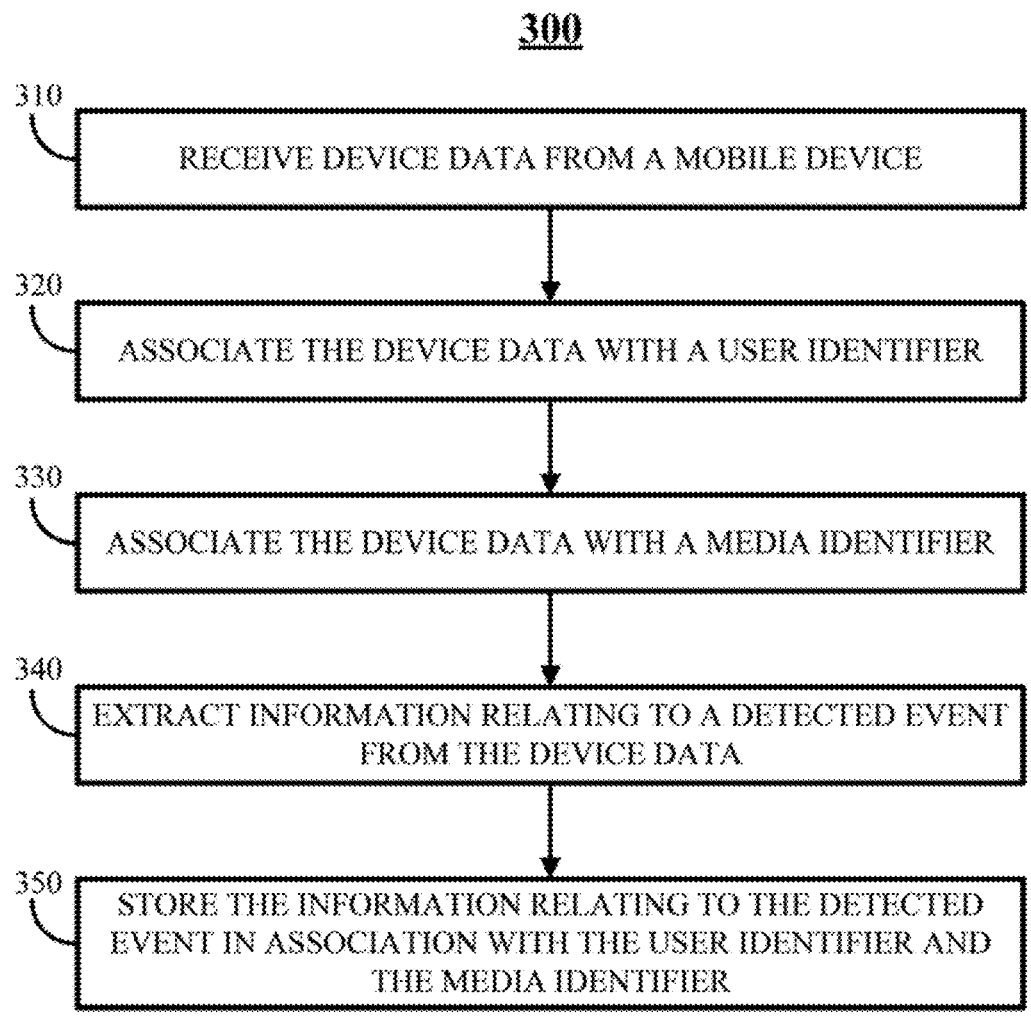
FIG. 3 shows an illustrative example of a process for providing media guidance based on detected user events in accordance with some implementations of the disclosed subject matter.

Turning to FIG. 3, a flow chart of an example 300 of a process for providing media guidance is shown in accordance with some implementations of the disclosed subject matter. In some implementations, process 300 can be implemented using one or more hardware processors, such as a hardware processor 722 and/or a hardware process 732 as described hereinbelow in connection with FIG. 7.

As illustrated, process 300 can begin by receiving, from a mobile device, device data at 310. In some implementations, the device data can be generated and transmitted as describe above in connection with FIG. 1. In some implementations, the device data can include program information relating to a media content item (e.g., a television program, a streaming media program, etc.), such as a channel number of a channel that provides the program, a program title, a URL, etc. In some implementations, the device data can include information relating to a user event that occurred during presentation of the media content, such as a start timestamp associated with the detected user event, an end timestamp associated with the detected user event, the duration of the detected user event, an event identifier that can be used to identify the detected user event, a description of the detected user event, etc. In some implementations, the device data can include any suitable identifying information relating to a user and/or a mobile device associated with a user, such as any suitable identifying information gathered at 240 of FIG. 2.

At 320, process 300 can associate the device data with a user identifier. In some implementations, a user identifier can be a string, a number, or any suitable combination of numbers, letters, characters, symbols, etc. that can be used to uniquely identify a user and/or a mobile device associated with the user. In some implementations, the user identifier can have any suitable length and value.

In some implementations, process 300 can identify an existing user identifier that has been associated with the mobile device identified using the device data and can then associate the device data with the existing user identifier. Alternatively or additionally, process 300 can generate a user identifier upon receiving the device data. For example, a user identifier can be generated using a random number generator, a pseudorandom number generator, a hash function, and/or any other suitable mechanism that can be used to generate a user identifier.

At 330, process 300 can associate the device data with a media identifier. In some implementations, a media identifier can be a string, a number, or any suitable combination of numbers, letters, characters, symbols, etc. that can be used to uniquely identify a piece of media content. In some implementations, a media identifier can be generated based on the program information included in the request. Alternatively or additionally, the device data can be associated with an existing media identifier that has been assigned to the media content relating to the program information.

At 340, process 300 can extract information relating to a detected event from the device data. For example, process 300 can parse the device data and extract an event identifier, a description, and/or any other suitable information associated with the user event. As another example, process 300 can extract a start timestamp associated with the user event and can determine that the mobile device has been interacted with during the presentation of the media content. As yet another example, process 300 can extract an end timestamp associated with the user event and can determine that the user interaction with the mobile device has ceased by a time corresponding to the end timestamp. In some implementations, process 300 can calculate the duration of the detected user event based on the start timestamp and the end timestamp or extract the duration from the device data.

At 350, process 300 can store the information relating to the detected user event in association with the user identifier and the media identifier. For example, the information relating to the detected user event can be stored in a database indexed by user identifier and media identifier. In a more particular example, each timestamp associated with a particular detected event can be stored in association with a user identifier, a media identifier, an event identifier, and/or any other suitable information, such that, in response to receiving a subsequent request for playback information relating to a particular program and a particular mobile device or user, the server can retrieve stored timestamps and/or any other suitable information relating to detected events associated with the media content and the mobile device or user.

Figure 4:
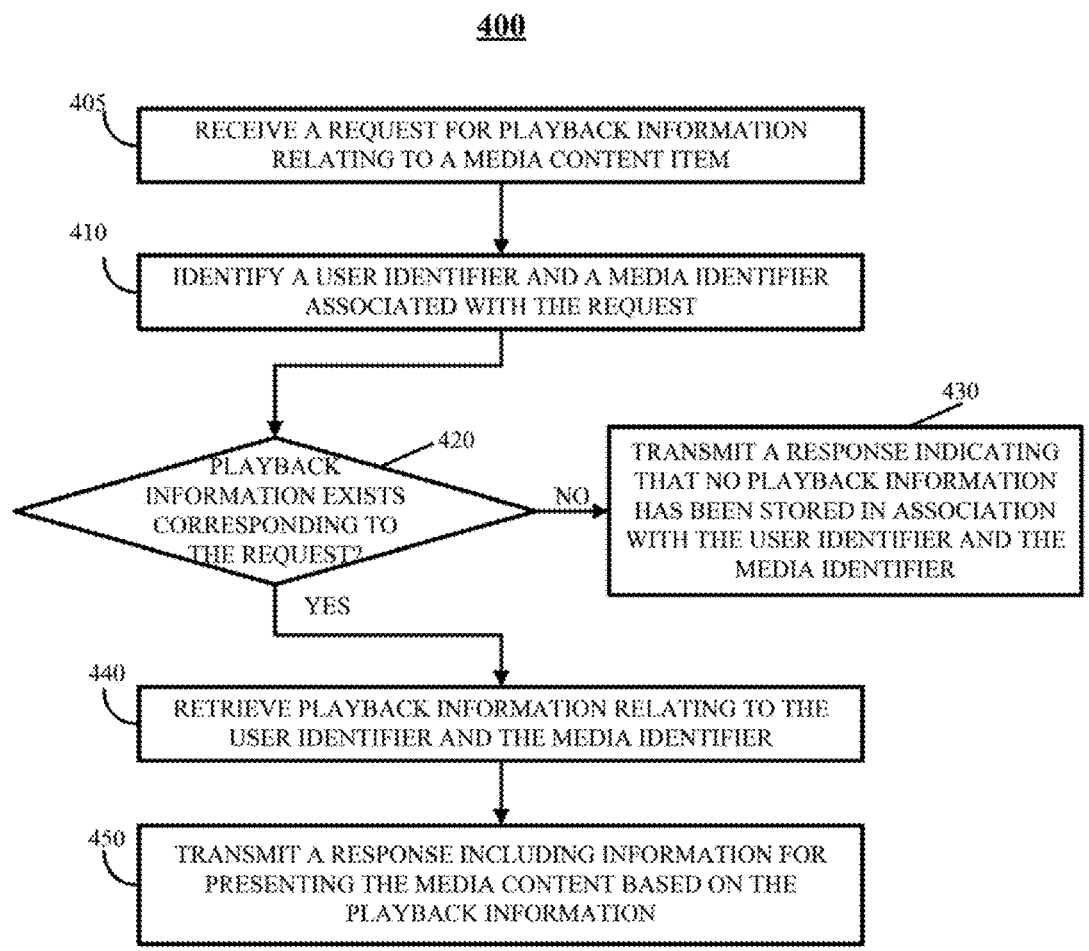
FIG. 4 shows an illustrative example of a process for providing playback information based on detected user events in accordance with some implementations of the disclosed subject matter.

Turning to FIG. 4, a flow chart of an example 400 of a process for providing playback information based on detected user events is shown in accordance with some implementations of the disclosed subject matter. In some implementations, process 400 can be implemented using one or more hardware processors, such as a hardware processor 722 and/or a hardware process 732 as described hereinbelow in connection with FIG. 7.

As illustrated, process 400 can begin by receiving a request for playback information at 405. In some implementations, as described above in connection with FIG. 2, the request for playback information can be generated and/or transmitted in response to receipt of a rewind request.

In some implementations, the request for playback information can include any suitable information. For example, the request for playback information can include any suitable identifying information relating to a user and/or a mobile device associated with the rewind request. In a more particular example, the identifying information can include a MAC address, a serial number, a product identifier, and/or any other suitable information that can be used to identify a mobile device associated with the user. In another more particular example, the identifying information can include information relating to a username, an email address, a pass code, a URL, and/or any other suitable information that can be used to identify the user. As another example, the request for playback information can include any suitable program information that can be used to identify a program associated with the rewind request, such as a program title, a channel number, a start time, etc.

At 410, process 400 can identify a user identifier and a media identifier associated with the received request for playback information. In some implementations, process 400 can identify a user identifier (e.g., a user identifier as described in connection with 320 of FIG. 3) associated with the identifying information included in the request. In some implementations, process 400 can identify a media identifier (e.g., a media identifier as described in connection with 330 of FIG. 3) associated with the program information included in the request.

At 420, process 400 can determine whether playback information exists corresponding to the user identifier and the media identifier. For example, process 400 can determine whether any information relating to a user event (e.g., timestamps, event identifiers, durations, descriptions, etc.) has been stored in association with the user identifier and the media identifier.

In some implementations, in response to determining that no playback information has been stored in association with the user identifier and/or the media identifier ("NO" at 420), process 400 can transmit a response indicating such determination at 430.

Alternatively, in response to detecting playback information stored in association with the user and the media content item ("YES" at 420), process 400 can retrieve playback information associated with the user identifier and the media identifier at 440. For example, process 400 can retrieve one or more timestamps corresponding to one or more user events associated with the user identifier and the media identifier. As another example, process 400 can retrieve durations of multiple user events associated with the user identifier and the media identifier.

At 450, process 400 can transmit a response including information for presenting the media content based on the playback information. In some implementations, the response can include any suitable playback information relating to the request. For example, the response can include one or more of the retrieved timestamps associated with the user identifier and the media identifier. In a more particular example, process 400 can retrieve a start timestamp associated with the user identifier and the media identifier, such as the most recent start timestamp. In another more particular example, the response can include an end timestamp corresponding to the end of a given user event associated with the user identifier and the media identifier. In some implementations, the response can also include any suitable information relating to one or more user events associated with the user identifier and the media identifier, such as event identifiers, descriptions, etc.

In some implementations, process 400 can select one or more user events from multiple detected user events associated with the user identifier and can then transmit a response including information stored in association with the selected user events. For example, multiple events associated with the user identifier and the media identifier can be ranked by recency, duration, type of user events, and/or any other suitable criterion or criteria. In such an example, one or more user events (e.g., a predetermined number of user events) can be selected based on the ranking. In a more particular implementation, process 400 can select the most recent user event, the second most recent user event, and/or any other suitable number of user events based on the recency of the user events. In another more particular example, process 400 can select one or more of the user events having a duration that is greater than a predetermined time period.

In some implementations, process 400 can identify multiple portions of the media content item based on the start timestamps and the end timestamps associated with the user identifier and the media identifier. Process 400 can then generate a composite video by combing the identified portions. For example, process 400 can generate a snippet for each of the identified portions of the media content. Additionally, process 400 can generate a composite video by combining the snippets of the media content.

In some implementations, the response can be transmitted using any suitable communication protocol, such as the Hypertext Transfer Protocol (HTTP), the File Transfer Protocol (FTP), and/or any other communication protocol that can be used to transmit playback information. In some implementations, the response can include the playback information associated with the user identifier and the media identifier (e.g., start timestamps, end timestamps, a composite video, snippets of media content), data that can be used to present the media content based on the playback information (e.g., one or more uniform resource locators (URLs) associated with the composite video, a set of URLs associated with a set of segments of the composite video and/or snippets of media content, HyperText Markup Language (HTML) files, images, scripts, style sheets, audio files, and/or any other suitable data that can be used to present the composite video), and/or any other suitable data.

It should be noted that the above steps of the flow diagrams of FIGS. 1-4 can be executed or performed in any order or sequence not limited to the order and sequence shown and described in the figure. Also, some of the above steps of the flow diagrams of FIGS. 1-4 can be executed or performed substantially simultaneously where appropriate or in parallel to reduce latency and processing times. Furthermore, it should be noted that FIGS. 1-4 are provided as examples only. At least some of the steps shown in these figures may be performed in a different order than represented, performed concurrently, or altogether omitted.

Figure 6:
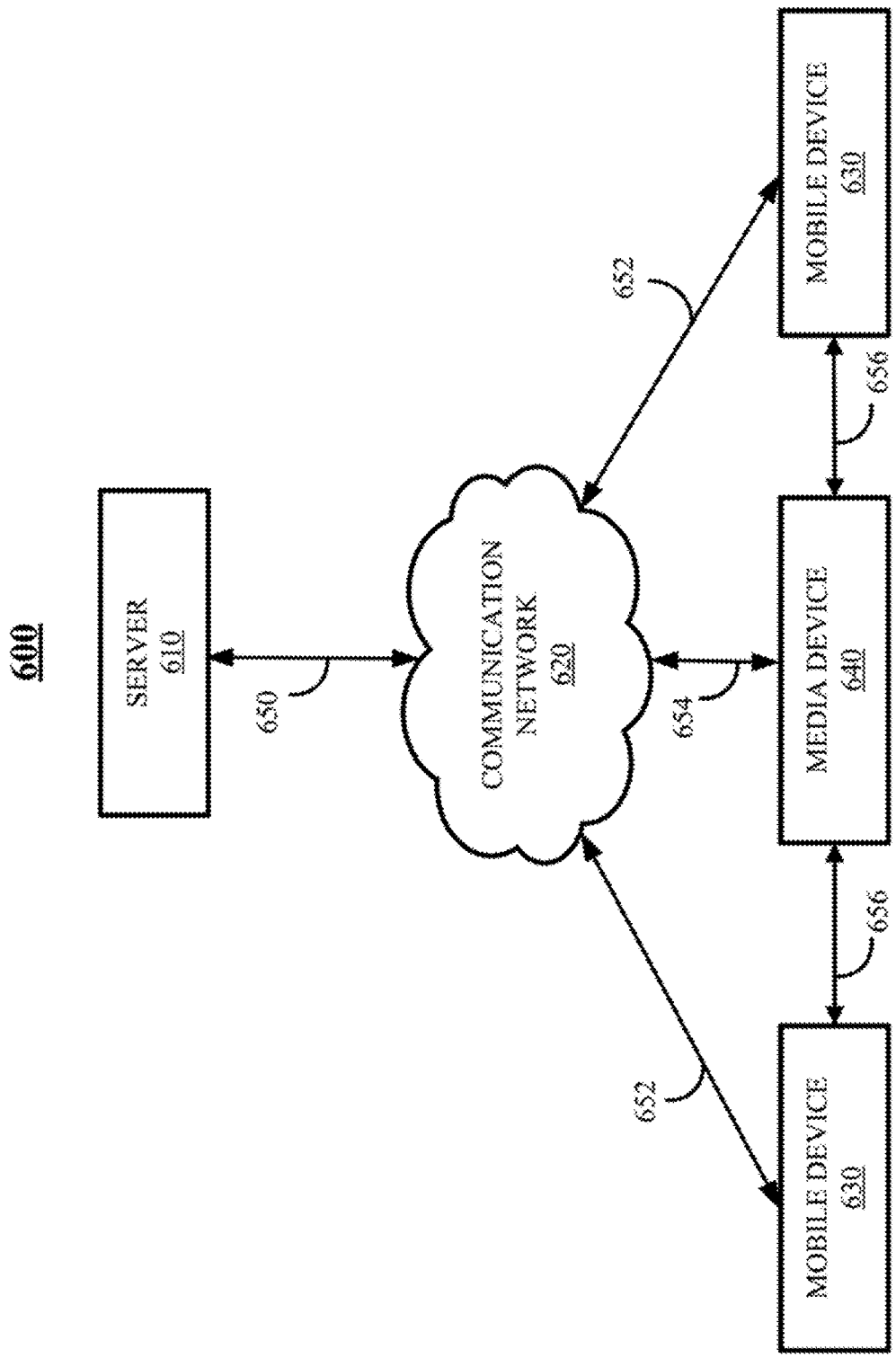
FIG. 6 shows a schematic diagram of an illustrative system suitable for implementation of the mechanisms described herein for providing media guidance in accordance with some implementations of the disclosed subject matter.

Turning to FIG. 6, an example 600 of a system for providing media guidance based on detected user events is shown in accordance with some implementations of the disclosed subject matter. As illustrated, system 600 can include one or more servers 610, a communication network 620, one or more mobile device 630, a media device 640, and communication links 650, 652, 654, and 656.

Server(s) 610 can include one or more suitable devices that can receive device data including information about user events occurring during presentation of media content, indexing and storing information about user events by media content and user, providing media guidance based on user events detected during presentation of media content, and/or perform any other suitable functions.

Mobile device(s) 630 can be any suitable device that is capable of receiving and/or processing user inputs, detecting user events during presentation of media content, generating and/or transmitting device data, and/or performing any other suitable functions. For example, mobile device(s) 630 can include a remote control, a mobile phone, a tablet computer, a laptop computer, a desktop computer, a personal data assistant (PDA), a portable email device, a voice recognition system, a gesture recognition system, a keyboard, a mouse, a microphone, etc.

Although two mobile devices 630 are shown in FIG. 6 to avoid over-complicating the drawing, any suitable number of these devices, and any suitable types of these devices, can be used in some implementations.

Media device 640 can be any suitable device that is capable of presenting media content, receiving and processing controls signals indicative of requests for rewinding media content, requesting and/or receiving playback information relating to media content, and/or performing any other suitable functions. Examples of media device 640 include a digital video recorder, a digital media player, a set-top box, a streaming media device, a media center computer, a DVD recorder, a BLU-RAY player, a television device, a tablet computing device, a laptop, a desktop, a mobile phone, a game console, a CD player, a MP3 player, an electronic book reader, a set-top box, etc. In some implementations, the media content can include any suitable content, such as audio content, video content, multimedia content, etc. In some implementations, the media content can have any suitable format, such as MP3, WMA, WMV, OCD, MPEG-DST, AVI, MOV, etc.

In some implementations, each of server 610, mobile device 630, and media device 640 can be any of a general purpose device, such as a computer or a special purpose device such as a client, a server, etc. Any of these general or special purpose devices can include any suitable components such as a hardware processor (which can be a microprocessor, a digital signal processor, a controller, etc.), memory, communication interfaces, display controllers, input devices, a storage device (which can include a hard drive, a digital video recorder, a solid state storage device, a removable storage device, or any other suitable storage device), etc.

In some implementations, each of server 610, mobile device 630, and media device 640 can be connected to communication network 620 through communication links 650, 652, and 654, respectively. In some implementations, media device 640 can be connected to mobile device 630 through communication link 656. Communication links 650, 652, 654, and 656 can be any suitable communication links, such as network links, dial-up links, wireless links, hard-wired links, any other suitable communication links, or a combination of such links. In some implementations, each of communication links 650, 652, 654, and 656 can include one or more infrared (IR) communication links, High-Definition Multimedia Interface (HDMI) links, local area network (LAN) links, etc.

Communication network 620 can be any suitable computer network including the Internet, an intranet, a wide-area network ("WAN"), a local-area network ("LAN"), a wireless network, a digital subscriber line ("DSL") network, a frame relay network, an asynchronous transfer mode ("ATM") network, a virtual private network ("VPN"), a cable television network, a fiber optic network, a telephone network, a satellite network, or any combination of any of such networks.

Figure 7:
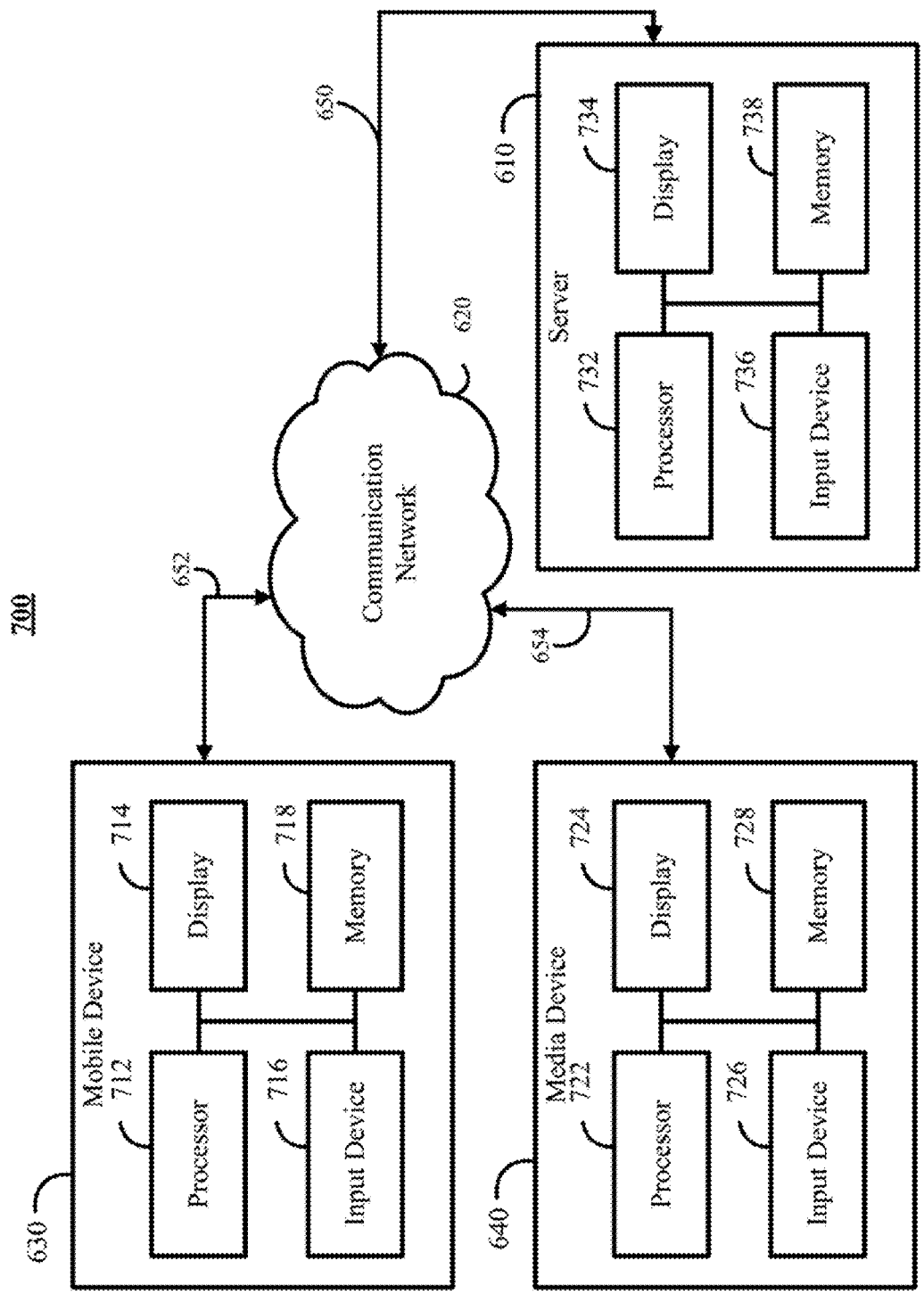
FIG. 7 shows a detailed example of a server, a media device, and a mobile device of FIG. 6 that can be used in accordance with some implementations of the disclosed subject matter.

FIG. 7 illustrates an example 700 of hardware that can be used to implement one or more of mobile device 630, media device 640, and server 650 depicted in FIG. 6 in accordance with some implementations of the disclosed subject matter. Referring to FIG. 7, mobile device 630 can include a hardware processor 712, a display 714, an input device 716, and memory 718, which can be interconnected. In some implementations, memory 718 can include a storage device (such as a non-transitory computer-readable medium) for storing a computer program for controlling hardware processor 712.

Hardware processor 712 can use the computer program to execute the mechanisms described herein for providing media guidance based on detected user events. In some implementations, hardware processor 712 can send and receive data through communications link 654 or any other communication links using, for example, a transmitter, a receiver, a transmitter/receiver, a transceiver, or any other suitable communication device. Display 714 can include a touchscreen, a flat panel display, a cathode ray tube display, a projector, a speaker or speakers, and/or any other suitable display and/or presentation devices. Input device 716 can be a computer keyboard, a computer mouse, a touchpad, a voice recognition circuit, a touchscreen, and/or any other suitable input device.

Media device 420 can include a hardware processor 722, a display 724, an input device 726, and memory 728, which can be interconnected. In some implementations, memory 728 can include a storage device (such as a non-transitory computer-readable medium) for storing a computer program for controlling hardware processor 722.

Hardware processor 722 can use the computer program to present on display 724 digital and/or analog media content, and to send and receive data through communications link 654. In some implementations, hardware processor 722 can send and receive data through communications link 654 or any other communication links using, for example, a transmitter, a receiver, a transmitter/receiver, a transceiver, or any other suitable communication device. Display 724 can include a touchscreen, a flat panel display, a cathode ray tube display, a projector, a speaker or speakers, and/or any other suitable display and/or presentation devices. Input device 726 can be a remote control, a computer keyboard, a computer mouse, a touchpad, a voice recognition circuit, a touchscreen, and/or any other suitable input device.

Server 610 can include a hardware processor 732, a display 734, an input device 736, and memory 738, which can be interconnected. In some implementations, memory 738 can include a storage device for storing data received through communications link 650 or through other links. The storage device can further include a server program for controlling hardware processor 732. In some implementations, memory 738 can include the device identification database, and hardware processor 732 can receive queries to the device identification database from mobile devices 630 and transmit responses back to a requesting mobile device 630.

Hardware processor 732 can use the server program to communicate with mobile device 630 as well as provide access to and/or copies of the mechanisms described herein. It should also be noted that data received through communications link 650 or any other communications links can be received from any suitable source. In some implementations, hardware processor 732 can send and receive data through communications link 650 or any other communication links using, for example, a transmitter, a receiver, a transmitter/receiver, a transceiver, or any other suitable communication device. In some implementations, hardware processor 732 can receive commands and/or values transmitted by one or more user devices and/or one or more users of server 610, such as a user that manually enters device information in the device identification database. Display 734 can include a touchscreen, a flat panel display, a cathode ray tube display, a projector, a speaker or speakers, and/or any other suitable display and/or presentation devices. Input device 736 can be a computer keyboard, a computer mouse, a touchpad, a voice recognition circuit, a touchscreen, and/or any other suitable input device.

In some implementations, server 610 can be implemented in one server or can be distributed as any suitable number of servers. For example, multiple servers 610 can be implemented in various locations to increase reliability and/or increase the speed at which the server can communicate with mobile devices 630.

In some implementations, the mechanisms described herein can be executed by a digital media device to detect the presence of a user device on a network. For example, a television can execute the mechanisms described herein to detect the presence of a mobile device on a network to which the television is connected.

In some implementations, the mechanisms described herein can include server-side software, client-side software, server-side hardware, client-side hardware, firmware, or any suitable combination thereof. For example, these mechanisms can encompass one or more Web pages or Web page portions (e.g., via any suitable encoding, such as Hyper Text Markup Language ("HTML"), Dynamic Hyper Text Markup Language ("DHTML"), Extensible Markup Language ("XML"), JavaServer Pages ("JSP"), Active Server Pages ("ASP"), Cold Fusion, or any other suitable approaches). As another example, these mechanisms can encompass a computer program that causes a processor to execute the mechanisms described herein. For instance, these mechanisms can encompass a computer program written in a programming language recognizable by mobile device 630, digital media device 420, and/or server 430 that is executing the mechanisms (e.g., a program written in a programming language, such as, Java, C, Objective-C, C++, C#, JavaScript, Visual Basic, HTML, XML, ColdFusion, any other suitable approaches, or any suitable combination thereof).

In situations in which the mechanisms described herein collect personal information about users, or can make use of personal information, the users can be provided with an opportunity to control whether programs or features collect user information (e.g., information about cached device details on a user's user device, devices discovered on networks to which the user device is connected, an address from which a database query is sent, a social network, social actions or activities, profession, a user's preferences, or a user's current location), or to control whether and/or how to receive content from the server that can be more relevant to the user. In addition, certain data can be treated in one or more ways before it is stored or used, so that personally identifiable information is removed. For example, a user's identity can be treated so that no personally identifiable information can be determined for the user, or a user's geographic location can be generalized where location information is obtained (such as to a city, ZIP code, or state level), so that a particular location of a user cannot be determined. Thus, the user can have control over how information is collected about the user and used by a content server.

In some implementations, any suitable computer readable media can be used for storing instructions for performing the functions and/or processes described herein. For example, in some implementations, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

The provision of the examples described herein (as well as clauses phrased as "such as," "e.g.," "including," and the like) should not be interpreted as limiting the claimed subject matter to the specific examples; rather, the examples are intended to illustrate only some of many possible aspects.

Accordingly, methods, systems, and media for providing media guidance based on detected user events are provided.

Although the disclosed subject matter has been described and illustrated in the foregoing illustrative implementations, it is understood that the present disclosure has been made only by way of example, and that numerous changes in the details of implementations of the disclosed subject matter can be made without departing from the spirit and scope of the disclosed subject matter, which is limited only by the claims that follow. Features of the disclosed implementations can be combined and rearranged in various ways.

What is claimed is:

1. A method for providing media guidance based on detected user events, the method comprising:
  receiving device data from a mobile device associated with a display device;
  identifying, from the device data, a media content item being presented on the display device;
  determining, from the device data, a plurality of first indications that the mobile device has been interacted with during the presentation of the media content item;
  storing a plurality of first timestamps corresponding to the plurality of first indications;
  determining, from the device data, a plurality of second indications that an interaction with the mobile device has ceased;
  storing a plurality of second timestamps corresponding to the plurality of second indications;
  associating a portion of the plurality of first timestamps and a portion of the second timestamps with the identified media content item;
  generating a plurality of snippets of the media content item based on the portion of the plurality of first timestamps and the portion of the plurality of second timestamps;
  generating a composite video by combining the plurality of snippets of the media content item;
  receiving an indication that the media content item is to be played back; and
  causing the composite video to be transmitted to the mobile device in response to receiving the indication.

2. The method of claim 1, further comprising:
  determining a first playback position in the media content item based on one of the plurality of first timestamps;
  determining a second playback position in the media content item based on one of the plurality of second timestamps; and
  causing the media content item to be presented based on the first playback position and the second playback position.

3. The method of claim 1, further comprising generating a first snippet of the media content item based on one of the plurality of first timestamps and one of the plurality of second timestamps.

4. The method of claim 1, further comprising:
  selecting a first snippet and a second snippet from the plurality of snippets, wherein the composite video is generated by concatenating a last frame of a first snippet with a first frame of a second snippet.

5. The method of claim 4, further comprising:
inserting a blank frame between the last frame of the first snippet and the first frame of the second snippet.

6. The method of claim 1, wherein the indication that the media content item is to be played back includes a request to rewind the media content item.

7. A system for providing media guidance based on detected user events, the system comprising:
at least one hardware processor that is configured to:
receive device data from a mobile device associated with a display device;
identify, from the device data, a media content item being presented on the display device;
determine, from the device data, a plurality of first indications that the mobile device has been interacted with during the presentation of the media content item;
store a plurality of first timestamps corresponding to the plurality of first indications;
determine, from the device data, a plurality of second indications that an interaction with the mobile device has ceased;
store a plurality of second timestamps corresponding to the plurality of second indications;
associate a portion of the plurality of first timestamps and a portion of the second timestamps with the identified media content item;
generate a plurality of snippets of the media content item based on the portion of the plurality of first timestamps and the portion of the plurality of second timestamps;
generate a composite video by combining the plurality of snippets of the media content item;
receive an indication that the media content item is to be played back;
and
cause the composite video to be transmitted to the mobile device in response to receiving the indication.

8. The system of claim 7, wherein the hardware processor is further configured to:
determine a first playback position in the media content item based on one of the plurality of first timestamps;
determine a second playback position in the media content item based on one of the plurality of second timestamps; and
cause the media content item to be presented based on the first playback position and the second playback position.

9. The system of claim 7, wherein the hardware processor is further configured to generate a first snippet of the media content item based on one of the plurality of first timestamps and one of the plurality of second timestamps.

10. The system of claim 7, wherein the hardware processor is further configured to:
select a first snippet and a second snippet from the plurality of snippets, wherein the composite video is generated by concatenating a last frame of a first snippet with a first frame of a second snippet.

11. The system of claim 10, wherein the hardware processor is further configured to:
insert a blank frame between the last frame of the first snippet and the first frame of the second snippet.

12. The method of claim 7, wherein the indication that the media content item is to be played back includes a request to rewind the media content item.

13. A non-transitory computer-readable medium containing computer executable instructions that, when executed by a processor, cause the processor to perform a method for providing media guidance based on detected user events, the method comprising:
receiving device data from a mobile device associated with a display device;
identifying, from the device data, a media content item being presented on the display device;
determining, from the device data, a plurality of first indications that the mobile device has been interacted with during the presentation of the media content item;
storing a plurality of first timestamps corresponding to the plurality of first indications;
determining, from the device data, a plurality of second indications that an interaction with the mobile device has ceased;
storing a plurality of second timestamps corresponding to the plurality of second indications;
associating a portion of the plurality of first timestamps and a portion of the second timestamps with the identified media content item;
generating a plurality of snippets of the media content item based on the portion of the plurality of first timestamps and the portion of the plurality of second timestamps;
generating a composite video by combining the plurality of snippets of the media content item;
receiving an indication that the media content item is to be played back;
and
causing the composite video to be transmitted to the mobile device in response to receiving the indication.

14. The non-transitory computer-readable medium of claim 13, wherein the method further comprises:
determining a first playback position in the media content item based on one of the plurality of first timestamps;
determining a second playback position in the media content item based on one of the plurality of second timestamps; and
causing the media content item to be presented based on the first playback position and the second playback position.

15. The non-transitory computer-readable medium of claim 13, wherein the method further comprises generating a first snippet of the media content item based on one of the plurality of first timestamps and one of the plurality of second timestamps.

16. The non-transitory computer-readable medium of claim 13, wherein the method further comprises:
selecting a first snippet and a second snippet from the plurality of snippets, wherein the composite video is generated by concatenating a last frame of a first snippet with a first frame of a second snippet.

17. The non-transitory computer-readable medium of claim 16, wherein the method further comprises:
inserting a blank frame between the last frame of the first snippet and the first frame of the second snippet.

18. The non-transitory computer-readable medium of claim 13, wherein the indication that the media content item is to be played back includes a request to rewind the media content item.

* * * * *